US012780983B2

(12) United States Patent
Park et al.

(10) Patent No.: US 12,780,983 B2
(45) Date of Patent: Nov. 3, 2026

(54) THERMOPLASTIC RESIN COMPOSITION AND ARTICLE PRODUCED THEREFROM

(71) Applicant: LOTTE CHEMICAL CORPORATION, Seoul (KR)

(72) Inventors: Chan Moo Park, Uiwang-si (KR); Sang Hwa Lee, Uiwang-si (KR); Cheol Hoon Jang, Uiwang-si (KR); Bong Jae Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 763 days.

(21) Appl. No.: 18/102,853

(22) Filed: Jan. 30, 2023

(65) Prior Publication Data

US 2023/0250224 A1 Aug. 10, 2023

(30) Foreign Application Priority Data

Feb. 10, 2022 (KR) ........................ 10-2022-0017415

(51) Int. Cl.

| | |
|---|---|
| ***C08G 63/183*** | (2006.01) |
| ***C08F 220/32*** | (2006.01) |
| ***C08K 7/14*** | (2006.01) |
| ***C08L 23/26*** | (2025.01) |
| ***C08L 69/00*** | (2006.01) |

(52) U.S. Cl.

CPC ........ *C08G 63/183* (2013.01); *C08F 220/325* (2020.02); *C08K 7/14* (2013.01); *C08L 23/26* (2013.01); *C08L 69/00* (2013.01); *C08L 2205/03* (2013.01)

(58) Field of Classification Search

CPC ..... C08G 63/183; C08F 220/325; C08K 7/14; C08L 23/26; C08L 69/00; C08L 2205/03; C08L 67/02; C08L 23/0884; C08J 5/124

See application file for complete search history.

(56) References Cited

U.S. PATENT DOCUMENTS

2011/0070431 A1* 3/2011 Noordegraaf ........... B32B 27/18 156/60
2012/0184662 A1* 7/2012 van der Mee .......... C08L 27/12 524/451
2015/0368458 A1 12/2015 Sun et al.
2022/0088903 A1 3/2022 Cole et al.
2022/0145069 A1 5/2022 Furukawa et al.
2024/0317992 A1* 9/2024 Lee .......................... C08K 7/14

FOREIGN PATENT DOCUMENTS

CN 107312305 A 11/2017
CN 108395681 A 8/2018
CN 113508160 A 10/2021
JP 2010-006858 A 1/2010
KR 10-0709878 B1 4/2007
KR 10-2020-0064498 A 6/2020
KR 10-2021-0050766 A 5/2021
KR 10-2021-0113253 A 9/2021
WO WO-2020111551 A1 * 6/2020 ............ C08L 33/068
WO WO-2022145732 A1 * 7/2022 ............... C08K 7/14

OTHER PUBLICATIONS

English machine translation of WO 2022145732 A1 (Year: 2025).*
Search Report in counterpart European Patent Application No. 23155541.8 dated Jun. 22, 2023, pp. 1-4.
Office Action in counterpart Korean Application No. 10-2022-0017415 dated Mar. 11, 2025, pp. 1-5.
Office Action in counterpart Chinese Application No. 202310047326.9 dated Apr. 24, 2025, pp. 1-9.

* cited by examiner

*Primary Examiner* — Randy P Gulakowski
*Assistant Examiner* — Holley Grace Hester
(74) *Attorney, Agent, or Firm* — Additon, Pendleton & Witherspoon, P.A.

(57) ABSTRACT

A thermoplastic resin composition includes about 100 parts by weight of a polybutylene terephthalate resin, about 3 parts by weight to about 33 parts by weight of a polycarbonate resin, about 60 parts by weight to about 120 parts by weight of glass fiber, and about 1 part by weight to about 9 parts by weight of a glycidyl methacrylate-modified polyolefin, wherein the glass fiber and the glycidyl methacrylate-modified polyolefin are present in a weight ratio of about 1:0.02 to about 1:0.12. The thermoplastic resin composition can have good properties in terms of glass adhesion, metal bonding, impact resistance, and balance therebetween.

8 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application No. 10-2022-0017415, filed on Feb. 10, 2022, the entire disclosure of which is incorporated herein by reference.

FIELD

The present invention relates to a thermoplastic resin composition and an article produced therefrom.

BACKGROUND

As engineering plastics, a polyester resin and a blend of a polyester resin and a polycarbonate resin exhibit useful properties and are applied to various fields including interior and exterior materials for electric/electronic products. However, the polyester resin has problems of low crystallization rate, low mechanical strength, and low impact strength.

Thus, various attempts have been made to improve mechanical properties including impact resistance and rigidity of the polyester resin by adding additives such as inorganic fillers to the polyester resin. For example, polybutylene terephthalate (PBT) resins reinforced by inorganic fillers, such as glass fiber and the like, are frequently used as materials for automobile components and the like. However, since such materials can have limited improvement in impact resistance, rigidity, and the like, there can be problems such as deterioration in glass adhesion, metal bonding, and the like.

Therefore, there is a need for development of a thermoplastic resin composition having good properties in terms of glass adhesion, metal bonding, impact resistance, and balance therebetween.

SUMMARY OF THE INVENTION

The present disclosure provides a thermoplastic resin composition that can have good properties in terms of glass adhesion, metal bonding, impact resistance, and balance therebetween, and an article produced therefrom.

The thermoplastic resin composition includes: about 100 parts by weight of a polybutylene terephthalate resin; about 3 parts by weight to about 33 parts by weight of a polycarbonate resin; about 60 parts by weight to about 120 parts by weight of glass fiber; and about 1 part by weight to about 9 parts by weight of a glycidyl methacrylate-modified polyolefin, wherein the glass fiber and the glycidyl methacrylate-modified polyolefin are present in a weight ratio of about 1:0.02 to about 1:0.12.

The polybutylene terephthalate resin may have an inherent viscosity [η] of about 0.5 dl/g to about 1.5 dl/g, as measured in accordance with ASTM D2857.

The polycarbonate resin may have a weight average molecular weight of about 10,000 g/mol to about 50,000 g/mol, as measured by gel permeation chromatography (GPC).

The glycidyl methacrylate-modified polyolefin may include about 4 wt % to about 15 wt % of glycidyl methacrylate.

The thermoplastic resin composition may have an average potential energy of about 700 mJ to about 870 mJ, as calculated by averaging potential energy values measured upon detachment of five specimens each having a size of 50 mm×50 mm×4 mm from a glass substrate having a size of 25 mm×25 mm×3 mm by dropping a dart having a weight of 50 g to 900 g onto the specimens from a height of 5 cm to 100 cm according to the DuPont drop test method, in which a urethane-based bonding agent (e.g., H.B. Fuller Co., Ltd., EH9777BS) is applied to a size of 15 mm×15 mm×1 mm on each of the specimens at 110° C. and the glass substrate is bonded to the bonding agent, followed by curing under conditions of 25° C. and 50% relative humidity (RH) for 72 hours.

The thermoplastic resin composition may have a metal bonding strength of about 35 MPa to about 50 MPa, as measured on an aluminum-based metal specimen in accordance with ISO 19095.

The thermoplastic resin composition may have a notched Izod impact strength of about 9 kgf·cm/cm to about 20 kgf·cm/cm, as measured on a ⅛" specimen in accordance with ASTM D256.

The present disclosure also relates to an article. The article is formed of the thermoplastic resin composition according to any embodiments of the present disclosure.

The present disclosure also relates to a composite material. The composite material includes a plastic member formed of the thermoplastic resin composition according to any embodiments of the present disclosure (e.g., the plastic member may be an article formed of the thermoplastic resin composition as disclosed herein); a metal member adjoining the plastic member; and a glass member bonded to the plastic member.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

Hereinafter, embodiments of the present invention will be described in detail.

A thermoplastic resin composition according to the present disclosure includes: (A) a polybutylene terephthalate resin; (B) a polycarbonate resin; (C) glass fiber; and (D) a glycidyl methacrylate-modified polyolefin.

As used herein to represent a specific numerical range, "a to b" means "≥a and ≤b".

(A) Polybutylene Terephthalate Resin

The polybutylene terephthalate (PBT) resin according to the present disclosure can serve to improve properties of the thermoplastic resin composition such as glass adhesion, metal bonding, impact resistance, and balance therebetween together with the polycarbonate resin and a specific ratio of glass fiber to glycidyl methacrylate-modified polyolefin, and may be a polybutylene terephthalate resin used in typical thermoplastic resin compositions. For example, the polybutylene terephthalate resin may be prepared through polycondensation of a dicarboxylic component, such as terephthalic acid (TPA) and the like, and a diol component, such as 1,3-butane diol, 1,4-butane diol, and the like.

In some embodiments, the polybutylene terephthalate resin may have an inherent viscosity [η] of about 0.5 dl/g to about 1.5 dl/g, for example, about 0.7 dl/g to about 1.3 dl/g, as measured in accordance with ASTM D2857. In some embodiments, the polybutylene terephthalate resin may have an inherent viscosity [η] of about 0.5, 0.6, 0.7, 0.8, 0.9, 1.0, 1.1, 1.2, 1.3, 1.4, or 1.5 dl/g. Further, according to some embodiments, the polybutylene terephthalate resin may have an inherent viscosity [η] of from about any of the foregoing values to about any other of the foregoing values.

Within this range, the thermoplastic resin composition can exhibit good properties in terms of mechanical properties, metal bonding, injection processability, and the like.

(B) Polycarbonate Resin

The polycarbonate resin according to the present disclosure can serve to improve the properties of the thermoplastic resin composition in terms of glass adhesion, metal bonding, impact resistance, and balance therebetween together with the polybutylene terephthalate resin and a specific ratio of glass fiber to glycidyl methacrylate-modified polyolefin and may be a polycarbonate resin used in typical thermoplastic resin compositions. For example, the polycarbonate resin may be an aromatic polycarbonate resin prepared by reacting diphenol(s) (aromatic diol compound(s)) with a precursor, such as phosgene, halogen formate, and/or carbonate diester.

Examples of the diphenols may include 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis-(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like, and mixtures and/or combinations thereof, without being limited thereto. For example, the diphenol(s) may include 2,2-bis(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or 1,1-bis(4-hydroxyphenyl)cyclohexane, for example 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, for example, a tri- or higher valent phenol group-containing compound, in an amount of about 0.05 mol % to about 2 mol % based on the total number of moles of the diphenol(s) used in polymerization.

In some embodiments, the polycarbonate resin may be a homopolycarbonate resin, a copolycarbonate resin, or a blend thereof. The polycarbonate resin may be partly or completely replaced by an aromatic polyester-carbonate resin prepared by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 20,000 g/mol to about 40,000 g/mol, as measured by gel permeation chromatography (GPC). Within this range, the thermoplastic resin composition can have good impact resistance, fluidity (processability), and the like.

In some embodiments, the thermoplastic resin composition may include the polycarbonate resin in an amount of about 3 parts by weight to about 33 parts by weight, for example, about 5 parts by weight to about 30 parts by weight, relative to about 100 parts by weight of the polybutylene terephthalate resin. In some embodiments, the thermoplastic resin composition may include the polycarbonate resin in an amount of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or 33 parts by weight, relative to about 100 parts by weight of the polybutylene terephthalate resin. Further, according to some embodiments, the polycarbonate resin can be present in an amount of from about any of the foregoing amounts to about any other of the foregoing amounts.

If the content of the polycarbonate resin is less than about 3 parts by weight relative to about 100 parts by weight of the polybutylene terephthalate resin, the thermoplastic resin composition can suffer from deterioration in glass adhesion, impact resistance, and the like, and if the content of the polycarbonate resin exceeds about 33 parts by weight, the thermoplastic resin composition can suffer from deterioration in metal bonding, fluidity, and the like.

(C) Glass Fiber

According to embodiments of the present disclosure, the glass fiber can serve to improve the properties of the thermoplastic resin composition in terms of glass adhesion, metal bonding, impact resistance, and balance therebetween together with the polybutylene terephthalate resin, the polycarbonate resin and a specific content of glycidyl methacrylate-modified polyolefin and may be glass fiber used in typical thermoplastic resin compositions.

In some embodiments, the glass fiber may have a fibrous shape and may have various cross-sectional shapes, such as circular, elliptical, and rectangular shapes. For example, fibrous glass fiber having circular and/or rectangular cross-sectional shapes may be useful in terms of mechanical properties.

In some embodiments, the glass fiber having a circular cross-section may have a cross-sectional diameter of about 5 μm to about 20 μm and a pre-processing length of about 2 mm to about 20 mm, as measured using techniques and equipment known in the art (e.g., using a scanning electron microscope (SEM)), and the glass fiber having a rectangular cross-section may have an aspect ratio (a ratio of a long-side length to a short-side length of a cross-section of the fiber) of about 1.5 to about 10, a short-side length of about 2 μm to about 10 μm, and a pre-processing length of about 2 mm to about 20 mm, also as measured using techniques and equipment known in the art (e.g., using a scanning electron microscope). Within this range, the thermoplastic resin composition can have good rigidity, processability, and the like.

In some embodiments, the glass fiber may be subjected to surface treatment with a typical surface treatment agent. Examples of the surface treatment agent may include silane compounds, urethane compounds, epoxy compounds, and the like, and mixtures and/or combinations thereof, without being limited thereto.

In some embodiments, the thermoplastic resin composition may include the glass fiber in an amount of about 60 parts by weight to about 120 parts by weight, for example, about 70 parts by weight to about 110 parts by weight, relative to about 100 parts by weight of the polybutylene terephthalate resin. In some embodiments, the thermoplastic resin composition may include the glass fiber in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 parts by weight, relative to about 100 parts by weight of the polybutylene terephthalate resin.

Further, according to some embodiments, the glass fiber can be present in an amount of from about any of the foregoing amounts to about any other of the foregoing amounts.

If the content of the glass fiber is less than about 60 parts by weight relative to about 100 parts by weight of the polybutylene terephthalate resin, the thermoplastic resin composition can suffer from deterioration in impact resistance, fluidity, and the like, and if the content of the glass fiber exceeds about 120 parts by weight, the thermoplastic resin composition can suffer from deterioration in glass adhesion, metal bonding, and the like.

(D) Glycidyl Methacrylate-Modified Polyolefin

According to embodiments of the present disclosure, the glycidyl methacrylate-modified polyolefin can serve to improve the properties of the thermoplastic resin composition in terms of glass adhesion, metal bonding, impact resistance, and balance therebetween together with the polybutylene terephthalate resin, the polycarbonate resin and a specific content of glass fiber.

The glycidyl methacrylate-modified polyolefin may be prepared as known in the art, for example, through polymerization of a glycidyl methacrylate compound containing a reactive functional group with a polyolefin. Examples of the polyolefin may include olefin homopolymers, olefin copolymers, olefin-(meth)acrylate copolymers, and the like, and mixtures and/or combinations thereof, without limitation.

In some embodiments, the glycidyl methacrylate-modified polyolefin may include about 4 wt % to about 15 wt %, for example, about 5 wt % to about 12 wt %, of glycidyl methacrylate, based on the total weight (100 wt %) of the glycidyl methacrylate-modified polyolefin. In some embodiments, the glycidyl methacrylate-modified polyolefin may include glycidyl methacrylate in an amount of about 4, 5, 6, 7, 8, 9, 10, 11, 12, 13, 14, or 15 wt %, based on the total weight (100 wt %) of the glycidyl methacrylate-modified polyolefin. Further, according to some embodiments, glycidyl methacrylate can be present in an amount of from about any of the foregoing amounts to about any other of the foregoing amounts.

Within this range, the thermoplastic resin composition (article) can exhibit good properties in terms of glass adhesion, metal bonding, impact resistance, fluidity, and the like.

Examples of the glycidyl methacrylate-modified polyolefin may include glycidyl methacrylate-ethylene copolymers, glycidyl methacrylate-methyl acrylate-ethylene copolymers, glycidyl methacrylate-butyl acrylate-ethylene copolymers, and the like, and mixtures and/or combinations thereof, without being limited thereto.

In some embodiments, the glycidyl methacrylate-modified polyolefin may have a melt-flow index of about 2 g/10 min to about 8 g/10 min, for example, about 3 g/10 min to about 7 g/10 min, as measured under conditions of 190° C. and 2.16 kg in accordance with ASTM D1238. In some embodiments, the glycidyl methacrylate-modified polyolefin may have a melt-flow index of about 2, 3, 4, 5, 6, 7, or 8 g/10 min. Further, according to some embodiments, the glycidyl methacrylate-modified polyolefin may have a melt-flow index of from about any of the foregoing melt-flow index to about any other of the foregoing melt-flow index. Within this range, the thermoplastic resin composition (article) can exhibit good glass adhesion, impact resistance, and the like.

In some embodiments, the thermoplastic resin composition may include the glycidyl methacrylate-modified polyolefin in an amount of about 1 part by weight to about 9 parts by weight, for example, about 2 parts by weight to about 8.2 parts by weight, relative to about 100 parts by weight of the polybutylene terephthalate resin. In some embodiments, the thermoplastic resin composition may include the glycidyl methacrylate-modified polyolefin in an amount of about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9 parts by weight, relative to about 100 parts by weight of the polybutylene terephthalate resin. Further, according to some embodiments, the glycidyl methacrylate-modified polyolefin can be present in an amount of from about any of the foregoing amounts to about any other of the foregoing amounts.

If the content of the glycidyl methacrylate-modified polyolefin is less than about 1 part by weight relative to about 100 parts by weight of the polybutylene terephthalate resin, the thermoplastic resin composition can suffer from deterioration in glass adhesion, impact resistance, and the like, and if the content of the glycidyl methacrylate-modified polyolefin exceeds about 9 parts by weight, the thermoplastic resin composition can suffer from deterioration in metal bonding, fluidity, injection processability, and the like.

In some embodiments, the glass fiber and the glycidyl methacrylate-modified polyolefin may be present in a weight ratio (C:D) of about 1:0.02 to about 1:0.12, for example, about 1:0.02 to about 1:0.10. In some embodiments, the glass fiber and the glycidyl methacrylate-modified polyolefin may be present in a weight ratio (C:D) of about 1:0.02, 1:0.03, 1:0.04, 1:0.05, 1:0.06, 1:0.07, 1:0.08, 1:0.09, 1:0.10, 1:0.11, or 1:0.12. If the weight ratio of the glass fiber to the glycidyl methacrylate-modified polyolefin is less than about 1:0.02, the thermoplastic resin composition can suffer from deterioration in glass adhesion, metal bonding, impact resistance, and the like, and if the weight ratio of the glass fiber to the glycidyl methacrylate-modified polyolefin exceeds about 1:0.12, the thermoplastic resin composition can suffer from deterioration in impact resistance, fluidity, injection processability, and the like.

The thermoplastic resin composition according to embodiments of the present disclosure may further include one or more additives used in typical thermoplastic resin compositions. Examples of the additives may include flame retardants, antioxidants, anti-dripping agents, lubricants, release agents, nucleating agents, antistatic agents, stabilizers, pigments, dyes, and the like, and mixtures and/or combinations thereof, without being limited thereto. The thermoplastic resin composition may include the additive(s) in an amount of about 0.001 to about 40 parts by weight, for example, about 0.1 to about 10 parts by weight, relative to about 100 parts by weight of the polybutylene terephthalate resin. In some embodiments, the thermoplastic resin composition may include the additive(s) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to about 100 parts by weight of the polybutylene terephthalate resin. Further, according to some embodiments, the additive(s) can be present in an amount of from about any of the foregoing amounts to about any other of the foregoing amounts.

The thermoplastic resin composition according to embodiments of the present invention may be prepared in pellet form by mixing the aforementioned components, followed by melt extrusion in a typical twin-screw extruder at about 240° C. to about 300° C., for example, about 260° C. to about 290° C.

In some embodiments, the thermoplastic resin composition may have an average potential energy of about 700 mJ to about 870 mJ, for example, about 730 mJ to about 860 mJ, as calculated by averaging potential energy values measured upon detachment of five specimens each having a size of 50 mm×50 mm×4 mm from a glass substrate having a size of 25 mm×25 mm×3 mm by dropping a dart having a weight of 50 g to 900 g onto the specimens from a height of 5 cm to 100 cm according to the DuPont drop test method, in which a urethane-based bonding agent (e.g., H.B. Fuller Co., Ltd., EH9777BS) is applied to a size of 15 mm×15 mm×1 mm on each of the specimens at 110° C. and the glass substrate is bonded to the bonding agent, followed by curing under conditions of 25° C. and 50% relative humidity (RH) for 72 hours. In some embodiments, the thermoplastic resin composition may have an average potential energy of about 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, or 870 mJ. Further, according to some embodiments, the thermoplastic resin composition may have an average potential energy of from about any of the foregoing average potential energies to about any other of the foregoing average potential energies.

In some embodiments, the thermoplastic resin composition may have a metal bonding strength of about 35 MPa to about 50 MPa, for example, about 35 MPa to about 45 MPa, as measured on an aluminum-based metal specimen in accordance with ISO 19095. In some embodiments, the thermoplastic resin composition may have a metal bonding strength of about 35, 36, 37, 38, 39, 40, 41, 42, 43, 44, 45, 46, 47, 48, 49, or 50 MPa. Further, according to some embodiments, the thermoplastic resin composition may have a metal bonding strength of from about any of the foregoing metal bonding strengths to about any other of the foregoing metal bonding strengths.

In some embodiments, the thermoplastic resin composition may have a notched Izod impact strength of about 9 kgf·cm/cm to about 20 kgf·cm/cm, for example, about 9 kgf·cm/cm to about 15 kgf·cm/cm, as measured on a ⅛" thick specimen in accordance with ASTM D256. In some embodiments, the thermoplastic resin composition may have a notched Izod impact strength of about 9, 10, 11, 12, 13, 14, 15, 16, 17, 18, 19, or 20 kgf·cm/cm. Further, according to some embodiments, the thermoplastic resin composition may have a notched Izod impact strength of from about any of the foregoing notched Izod impact strengths to about any other of the foregoing notched Izod impact strengths.

The present disclosure also relates to an article formed of the thermoplastic resin composition set forth above and described herein. The thermoplastic resin composition may be prepared in pellet form. The prepared pellets may be produced into various articles (products) by various molding methods, such as injection molding, extrusion, vacuum molding, casting, and the like. These molding methods are well known to those skilled in the art. The articles may have good properties in terms of glass adhesion, metal bonding, fluidity, impact resistance, and balance therebetween, and may be useful as interior and/or exterior materials of electric and/or electronic products, interior and/or exterior materials of automobiles, interior and/or exterior materials of portable electronic communication devices, and the like.

The present disclosure also relates to composite material. The composite material according to the present disclosure may include a plastic member (e.g., the plastic member may an article formed of the thermoplastic resin composition described herein); a metal member adjoining the plastic member; and a glass member bonded to the plastic member.

In some embodiments, the plastic member may directly adjoin the metal member without a bonding agent therebetween. For example, the plastic member and the metal member may be integrally formed with each other through insert-injection molding.

In some embodiments, the metal member may include at least one metal selected from among aluminum, titanium, iron, and zinc.

In some embodiments, the plastic member and the glass member may be bonded to each other through a bonding agent. For example, a glass member may be bonded to a product (e.g., may be bonded to a plastic member of a product including the plastic member and the metal member) after a product including the plastic member and the metal member is manufactured by insert-injection molding into a desired shape through a CNC process or the like.

Next, the present invention will be described in more detail with reference to the following examples. However, it should be noted that these examples are provided for illustration only and should not be construed in any way as limiting the invention.

EXAMPLE

Details of components used in the Examples and Comparative Examples are as follows.

(A) Polybutylene Terephthalate Resin

A polybutylene terephthalate resin (PBT, Manufacturer: Shinkong Synthetic Fibers, Product Name: Shinite K006, Inherent viscosity [η]: about 1.3 dl/g) is used.

(B) Polycarbonate Resin

A bisphenol-A polycarbonate resin (PC, Manufacturer: Lotte Chemical Co., Ltd., Weight average molecular weight: about 25,000 g/mol) is used.

(C) Glass Fiber

Flat type glass fiber (Manufacturer: Nittobo, Product Name: CSG 3PA-820, short-side length: about 7 μm, Aspect ratio on cross-section: about 4, Pre-processing length: about 3 mm) is used.

(D) Glycidyl Methacrylate-Modified Polyolefin (D1) Glycidyl methacrylate-modified polyolefin (Manufacturer: Arkema, Product Name: AX-8900, Glycidyl methacrylate content: 8 wt %) is used.

(D2) Glycidyl methacrylate-modified polyolefin (Manufacturer: Arkema, Product Name: AX-8670T, Glycidyl methacrylate content: 9 wt %) is used.

(D3) Glycidyl methacrylate-modified polyolefin (Manufacturer: Sumitomo, Product Name: BF-7B, Glycidyl methacrylate content: 12 wt %) is used.

(D4) Glycidyl methacrylate-modified polyolefin (Manufacturer: Arkema, Product Name: AX-8750, Glycidyl methacrylate content: 5 wt %) is used.

(E) An ethylene/methyl acrylate copolymer (Manufacturer: DuPont, Product Name: Elvaloy AC1330) is used.

Examples 1 to 12 and Comparative Examples 1 to 9

The aforementioned components are mixed in amounts as listed in Tables 1 to 4, followed by extrusion at 260° C., thereby preparing a thermoplastic resin composition in pellet form. Here, extrusion is performed using a twin-screw extruder (L/D: 44, Φ, 45 mm). The prepared pellets are dried at 80° C. for 4 hours or more and then subjected to injection molding using a 6 oz. injection machine (molding temperature: about 270° C., mold temperature: about 120° C.), thereby preparing specimens. The prepared specimens are evaluated as to the following properties. Results are shown in Tables 1, 2, 3 and 4.

Property Evaluation (1) Glass adhesive strength (unit: mJ): Average potential energy is calculated by averaging potential energy values measured upon detachment of five specimens each having a size of 50 mm×50 mm×4 mm from a glass substrate having a size of 25 mm×25 mm×3 mm by dropping a dart having a weight of 50 g to 900 g onto the specimens from a height of 5 cm to 100 cm according to the DuPont drop test method, in which a urethane-based bonding agent (e.g., H.B. Fuller Co., Ltd., EH9777BS) is applied to a size of 15 mm×15 mm×1 mm on each of the specimens at 110° C. and the glass substrate was bonded to the bonding agent, followed by curing at 25° C. and at 50% relative humidity (RH) for 72 hours.

Potential energy (Ep)=Mass (dart weight upon detachment)×gravitational acceleration (9.8)×(dart height upon detachment))

(2) Metal bonding strength (unit: MPa): Bonding strength is measured after bonding an aluminum-based metal specimen to a specimen of the thermoplastic resin composition through insert-injection molding in accordance with ISO 19095. Here, the metal specimen is an aluminum-based metal specimen subjected to TRI surface treatment of Geo Nation Co., Ltd. as known in the art and understood by the skilled artisan to facilitate bonding between the metal specimen and the resin specimen. Each of the metal specimen and the resin specimen has a size of 1.2 cm×4 cm×0.3 cm and bonding strength therebetween is measured after bonding the specimens to have a bonding area of 1.2 cm×0.3 cm.

(3) Notched Izod impact resistance (unit: kgf·cm/cm): Notched Izod impact strength is measured on a ⅛" thick specimen in accordance with ASTM D256.

TABLE 1

| | Example | | | | | |
|---|---|---|---|---|---|---|
| | 1 | 2 | 3 | 4 | 5 | 6 |
| (A) (parts by weight) | 100 | 100 | 100 | 100 | 100 | 100 |
| (B) (parts by weight) | 5 | 14.3 | 30 | 14.3 | 14.3 | 14.3 |
| (C) (parts by weight) | 89.8 | 89.8 | 89.8 | 70 | 110 | 89.8 |
| (D1) (parts by weight) | 6.1 | 6.1 | 6.1 | 6.1 | 6.1 | 2 |
| (D2) (parts by weight) | — | — | — | — | — | — |
| (D3) (parts by weight) | — | — | — | — | — | — |
| (D4) (parts by weight) | — | — | — | — | — | — |
| (E) (parts by weight) | — | — | — | — | — | — |
| Glass adhesive strength (mJ) | 763 | 816 | 843 | 839 | 753 | 741 |
| Metal bonding strength (MPa) | 42.1 | 41.0 | 38.1 | 43.8 | 36.8 | 38.7 |
| Notched Izod impact strength (kgf · cm/cm) | 9.1 | 11.3 | 13.2 | 9.2 | 14.8 | 9.3 |

TABLE 2

| | Example | | | | | |
|---|---|---|---|---|---|---|
| | 7 | 8 | 9 | 10 | 11 | 12 |
| (A) (parts by weight) | 100 | 100 | 100 | 100 | 100 | 100 |
| (B) (parts by weight) | 14.3 | 14.3 | 14.3 | 14.3 | 14.3 | 14.3 |
| (C) (parts by weight) | 89.8 | 89.8 | 89.8 | 89.8 | 89.8 | 89.8 |
| (D1) (parts by weight) | 8.2 | 4.1 | — | — | — | — |
| (D2) (parts by weight) | — | — | 4.1 | 6.1 | — | — |
| (D3) (parts by weight) | — | — | — | — | 6.1 | — |
| (D4) (parts by weight) | — | — | — | — | — | 6.1 |
| (E) (parts by weight) | — | — | — | — | — | — |
| Glass adhesive strength (mJ) | 835 | 787 | 776 | 802 | 768 | 766 |
| Metal bonding strength (MPa) | 42.3 | 39.9 | 40.2 | 41.4 | 39.5 | 38.4 |
| Notched Izod impact strength (kgf · cm/cm) | 12.2 | 9.8 | 10.2 | 11.6 | 9.9 | 10.7 |

TABLE 3

| | Comparative Example | | | |
|---|---|---|---|---|
| | 1 | 2 | 3 | 4 |
| (A) (parts by weight) | 100 | 100 | 100 | 100 |
| (B) (parts by weight) | 1 | 35 | 14.3 | 14.3 |
| (C) (parts by weight) | 89.8 | 89.8 | 50 | 130 |
| (D1) (parts by weight) | 6.1 | 6.1 | 6.1 | 6.1 |
| (D2) (parts by weight) | — | — | — | — |
| (D3) (parts by weight) | — | — | — | — |
| (D4) (parts by weight) | — | — | — | — |
| (E) (parts by weight) | — | — | — | — |
| Glass adhesive strength (mJ) | 680 | 848 | 852 | 689 |
| Metal bonding strength (MPa) | 41.1 | 32.4 | 43.2 | 34.4 |
| Notched Izod impact strength (kgf · cm/cm) | 8.7 | 13.5 | 7.3 | 14.9 |

TABLE 4

| | Comparative Example | | | | |
|---|---|---|---|---|---|
| | 5 | 6 | 7 | 8 | 9 |
| (A) (parts by weight) | 100 | 100 | 100 | 100 | 100 |
| (B) (parts by weight) | 14.3 | 14.3 | 14.3 | 14.3 | 14.3 |
| (C) (parts by weight) | 89.8 | 89.8 | 89.8 | 60 | 110 |
| (D1) (parts by weight) | 0.5 | 10 | — | 8.2 | 2 |
| (D2) (parts by weight) | — | — | — | — | — |
| (D3) (parts by weight) | — | — | — | — | — |
| (D4) (parts by weight) | — | — | — | — | — |
| (E) (parts by weight) | — | — | 6.1 | — | — |
| Glass adhesive strength (mJ) | 686 | 823 | 691 | 730 | 692 |
| Metal bonding strength (MPa) | 39.8 | 33.7 | 34.1 | 39.8 | 32.1 |
| Notched Izod impact strength (kgf · cm/cm) | 6.3 | 15.2 | 12.3 | 7.2 | 7.5 |

From the result, it can be seen that the thermoplastic resin composition according to the present disclosure exhibits good properties in terms of glass adhesion, metal bonding (metal bonding strength), impact resistance (notched Izod impact strength), and balance therebetween.

Conversely, it can be seen that the thermoplastic resin composition of Comparative Example 1 prepared using an insufficient amount of the polycarbonate resin exhibits deterioration in glass adhesion, impact resistance, and the like; the thermoplastic resin composition of Comparative Example 2 prepared using an excess of the polycarbonate resin exhibits deterioration in metal bonding and the like; the thermoplastic resin composition of Comparative Example 3 prepared using an insufficient amount of the glass fiber exhibits deterioration in impact resistance and the like; and the thermoplastic resin composition of Comparative Example 4 prepared using an excess of the glass fiber exhibits deterioration in glass adhesion, metal bonding, and the like. In addition, it can be seen that the thermoplastic resin composition of Comparative Example 5 prepared using an insufficient amount of the glycidyl methacrylate-modified polyolefin exhibits deterioration in glass adhesion, impact resistance, and the like; and the thermoplastic resin composition of Comparative Example 6 prepared using an excess of the glycidyl methacrylate-modified polyolefin exhibits deterioration in metal bonding and the like. It can be seen that the thermoplastic resin composition of Comparative Example 7 prepared using the ethylene/methyl acrylate copolymer (E) instead of the glycidyl methacrylate-modified polyolefin exhibits deterioration in glass adhesion, metal bonding, and the like. Further, it could be seen that, even with the glass fiber and the glycidyl methacrylate-modified polyolefin within the content ranges according to the present invention, the thermoplastic resin composition (Comparative Example 8) having a weight ratio (C:D1) (1:0.137) exceeding about 1:0.12 exhibits deterioration in impact resistance and the like, and the thermoplastic resin composition (Comparative Example 9) having a weight ratio (C:D1) (1:0.018) less than about 1:0.02 exhibits deterioration in glass adhesion, metal bonding, impact resistance, and the like.

Exemplary embodiments have been disclosed herein, and although specific terms are employed, unless otherwise noted, they are to be interpreted in a generic and descriptive sense only and not for purpose of limitation. Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The scope of the present invention should be defined by the appended claims and equivalents thereof.

It is within the scope of this disclosure for one or more of the terms "substantially," "about," "approximately," and/or the like, to qualify each adjective and adverb of the foregoing disclosure to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, numerical values provided throughout this disclosure can be approximate, and for each range specified in this disclosure, all values within the range and all subranges within the range are also disclosed. Approximate values can be calculated, and it is believed that each value can vary by for example plus or minus about 10%, for example plus or minus about 5%, for example plus or minus 4%, for example plus or minus 3%, for example plus or minus 2%, for example plus or minus 1%, for example plus or minus less than 1%, for example plus or minus 0.5%, and as another example less than plus or minus 0.5%, including all values and subranges therebetween for each of the above ranges.

The use of the term "and/or" includes any and all combinations of one or more of the associated listed items.

As used herein, indefinite articles "a" and "an" refer to at least one ("a" and "an" can refer to singular and/or plural element(s)).

What is claimed is:

1. A thermoplastic resin composition comprising:

about 100 parts by weight of a polybutylene terephthalate resin;

about 3 parts by weight to about 33 parts by weight of a polycarbonate resin;

about 60 parts by weight to about 120 parts by weight of glass fiber; and about 1 part by weight to about 9 parts by weight of a glycidyl methacrylate-modified polyolefin, wherein the glass fiber and the glycidyl methacrylate-modified polyolefin are present in a weight ratio of about 1:0.02 to about 1:0.12, wherein the thermoplastic resin composition has an average potential energy of about 700 mJ to about 870 mJ, as calculated by averaging potential energy values measured upon detachment of five specimens each having a size of 50 mm×50 mm×4 mm from a glass substrate having a size of 25 mm×25 mm×3 mm by dropping a dart having a weight of 50 g to 900 g onto the specimens from a height of 5 cm to 100 cm according to the DuPont drop test method, in which a urethane-based bonding agent is applied to a size of 15 mm×15 mm×1 mm on each of the specimens at 110° C. and the glass substrate is bonded to the bonding agent, followed by curing under conditions of 25° C. and 50% relative humidity (RH) for 72 hours.

2. The thermoplastic resin composition according to claim 1, wherein the polybutylene terephthalate resin has an inherent viscosity [η] of about 0.5 dl/g to about 1.5 dl/g, as measured in accordance with ASTM D2857.

3. The thermoplastic resin composition according to claim 1, wherein the polycarbonate resin has a weight average molecular weight of about 10,000 g/mol to about 50,000 g/mol, as measured by gel permeation chromatography (GPC).

4. The thermoplastic resin composition according to claim 1, wherein the glycidyl methacrylate-modified polyolefin comprises about 4 wt % to about 15 wt % of glycidyl methacrylate.

5. The thermoplastic resin composition according to claim 1, wherein the thermoplastic resin composition has a metal bonding strength of about 35 MPa to about 50 MPa, as measured on an aluminum-based metal specimen in accordance with ISO 19095.

6. The thermoplastic resin composition according to claim 1, wherein the thermoplastic resin composition has a notched Izod impact strength of about 9 kgf·cm/cm to about 20 kgf·cm/cm, as measured on a ⅛" specimen in accordance with ASTM D256.

7. An article formed of the thermoplastic resin composition according to claim 1.

8. A composite material comprising:

a plastic member formed of the thermoplastic resin composition according to claim 1;

a metal member adjoining the plastic member; and a glass member bonded to the plastic member.

* * * * *